SELF-GUIDING TOOLING SYSTEMS
Original Filed April 29, 1966 4 Sheets-Sheet 1
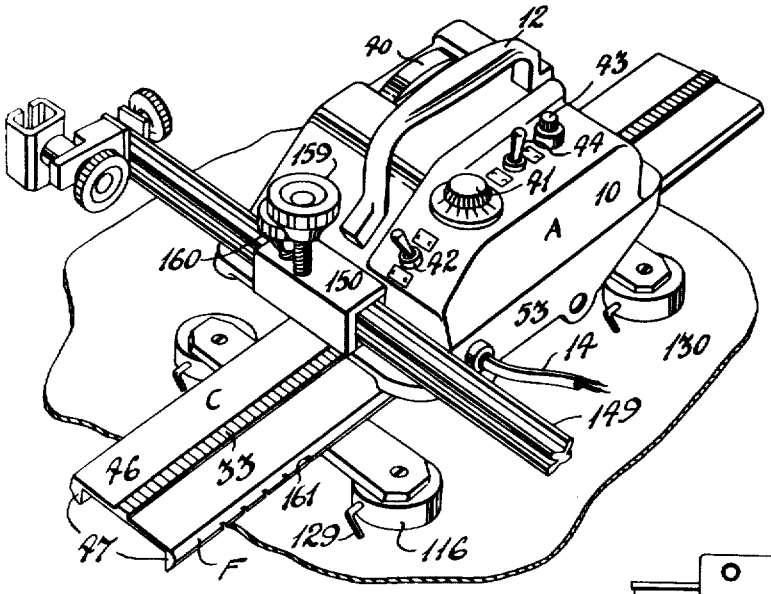
FIG. 1
FIG. 18
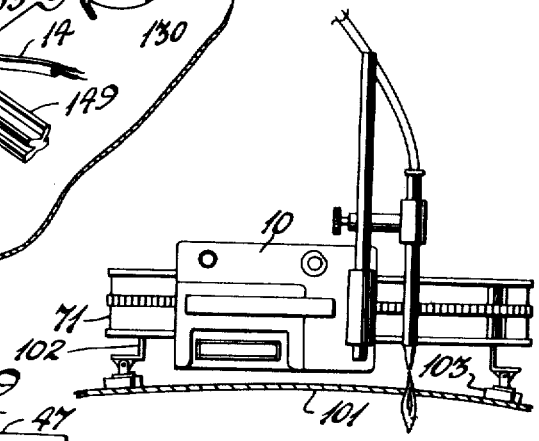
FIG. 19
FIG. 21
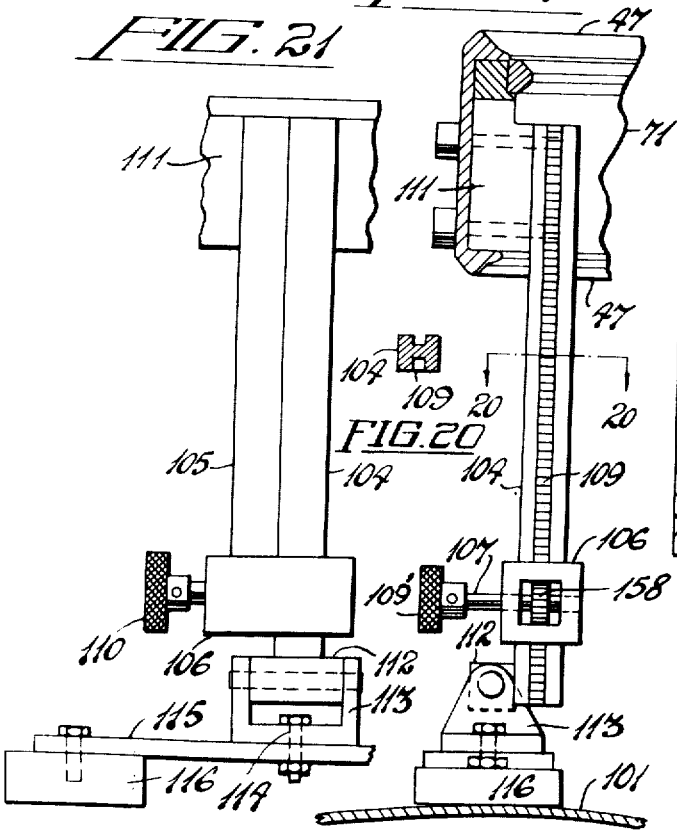
FIG. 20
FIG. 22
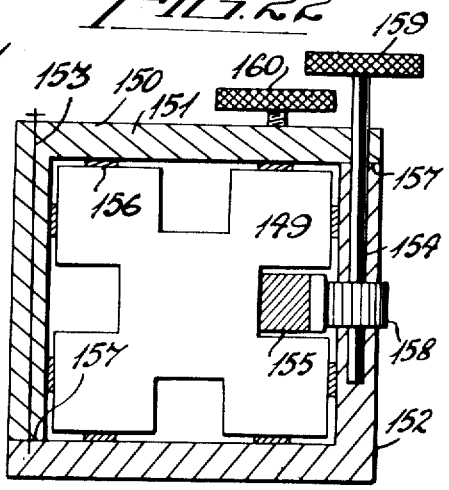

SELF-GUIDING TOOLING SYSTEMS
Original Filed April 29, 1966 4 Sheets-Sheet 2
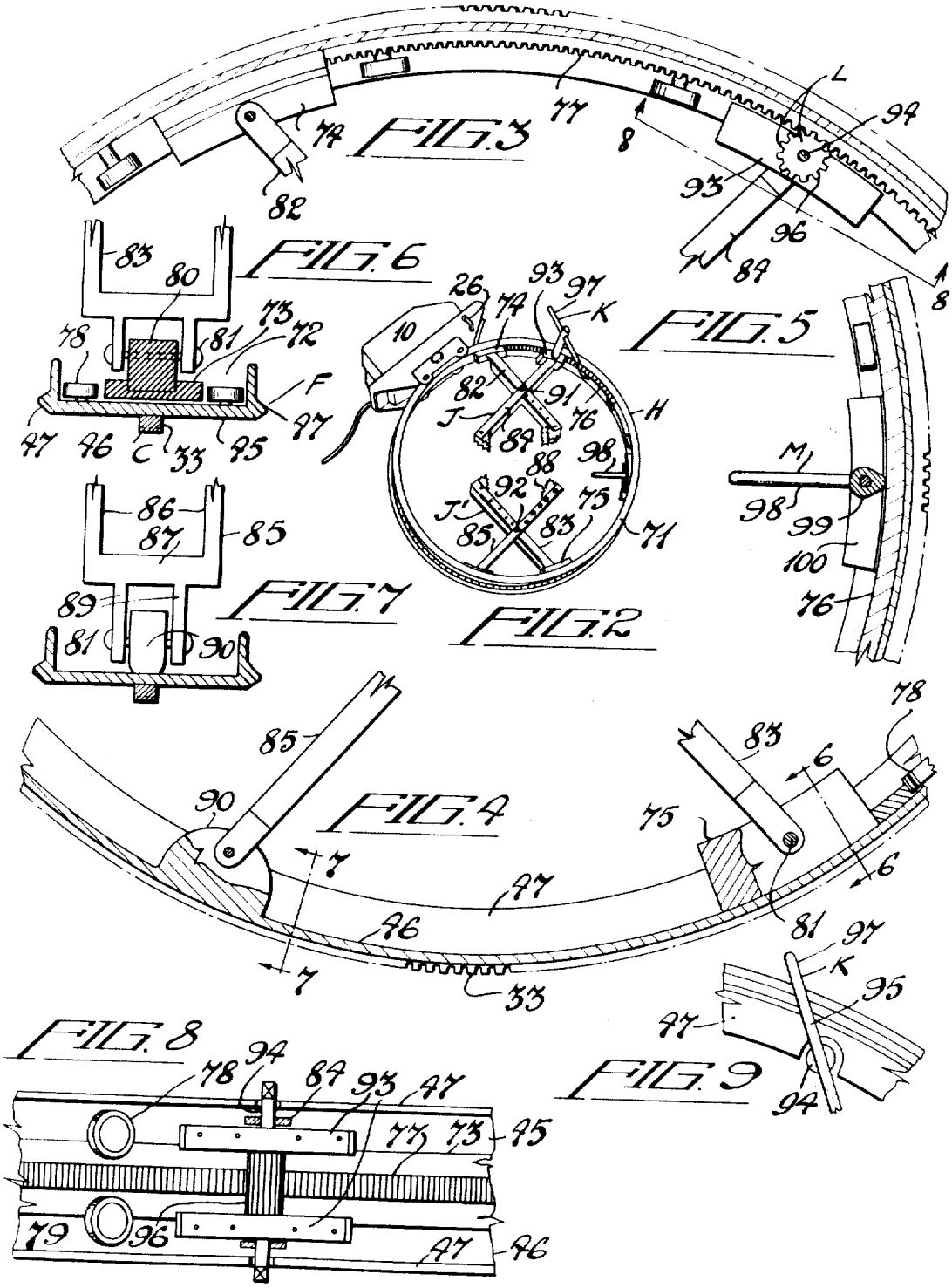

SELF-GUIDING TOOLING SYSTEMS

Original Filed April 29, 1966 4 Sheets-Sheet 3

SELF-GUIDING TOOLING SYSTEMS
Original Filed April 29, 1966 4 Sheets-Sheet 4
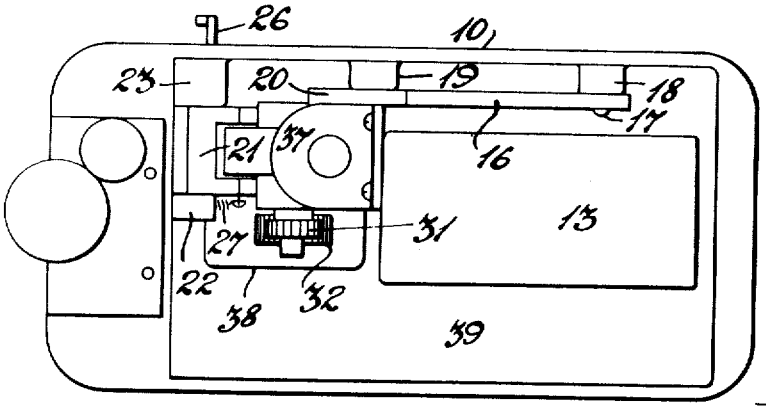
FIG. 16
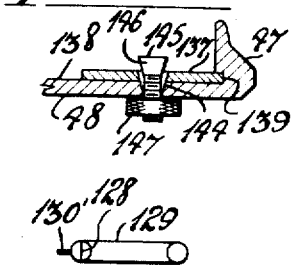
FIG. 28
FIG. 26
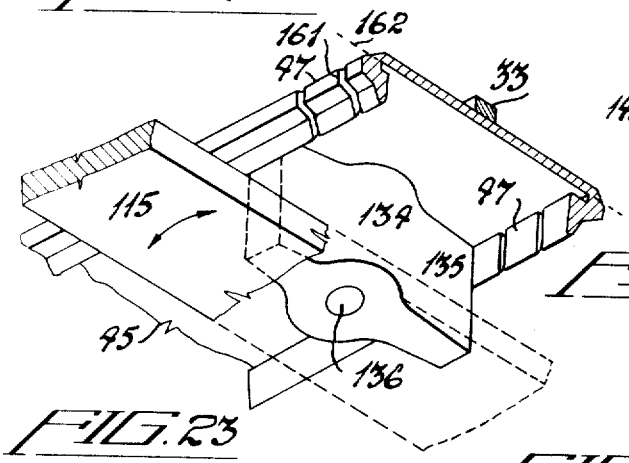
FIG. 23
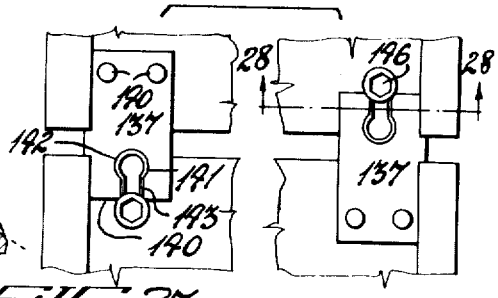
FIG. 27
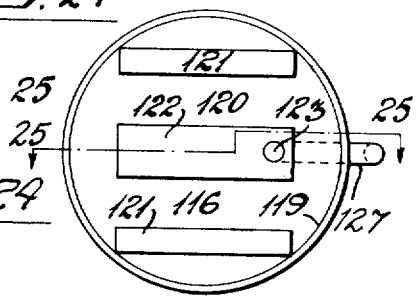
FIG. 24
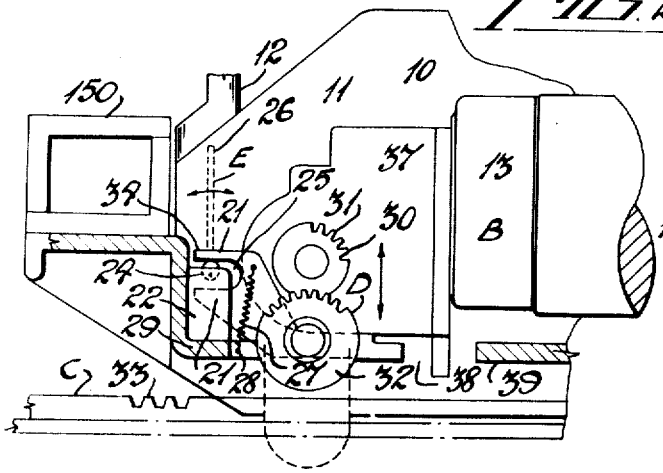
FIG. 17
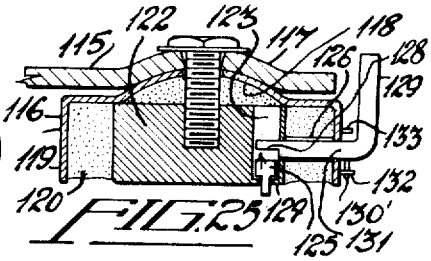
FIG. 25

United States Patent Office

Re. 28,121
Reissued Aug. 20, 1974

28,121

SELF-GUIDING TOOLING SYSTEMS

John M. Gulley, deceased, late of Toronto, Ontario, Canada, by Michael F. Harris, Toronto, Ontario, Canada, assignor to Polygon Industries Limited, Toronto, Ontario, Canada

Original No. 3,485,306, dated Dec. 23, 1969, Ser. No. 746,698, July 8, 1968, which is a continuation of abandoned application Ser. No. 546,370, Apr. 29, 1966. Application for reissue Sept. 13, 1972, Ser. No. 288,740
Claims priority, application Great Britain, May 3, 1965, 18,473/65; Oct. 28, 1965, 45,629/65
Int. Cl. B23k *5/00;* E21c *9/00, 11/00*
U.S. Cl. 173—32 17 Claims

Matter enclosed in heavy brackets [ ] appears in the original patent but forms no part of this reissue specification; matter printed in italics indicates the additions made by reissue.

ABSTRACT OF THE DISCLOSURE

A wheelable cutting or welding torch or other tool holding carriage and track combination capable of cutting, welding or processing sheet material especially metal to predetermined shapes while track-adherent only to one surface thereof. The carriage is motor-driven, gear-connected, and wheel-locked to track, and may be either gear-disconnected for free-wheeling thereon, [of] *or* unlocked for bodily removal. Wheels automatically align with track on carriage-attachment thereto. Carriage can ride track regardless, within limits, of ascending or declining track-curvature.

[This application is a continuation of application Ser. No. 546,370, filed Apr. 29, 1966 and now abandoned.] *This application is a reissue of application, Ser. No. 746,698 filed July 8, 1968, now U.S. Pat. No. 3,485,306, which is a continuation of application, Ser. No. 546,370 filed Apr. 29, 1966, now abandoned, and claims priority of application Great Britain, May 3, 1965, No. 18,473; Oct. 28, 1965, No. 45,629.*

The present invention relates to self-guiding tooling systems, and specifically to systems comprising in combination a plurality of operatively associated assemblages by means of which work, particularly plate-work, and particularly metallic platework or planar, curved or cylindrical configuration may be cut to various desired configurations, and particularly welding-torch cut, and either at right angles to the surface of the said work, or at a bevel. The system includes means for holding the concerned part or parts each to the other, and for holding the track-unit of the system securely against the concerned work. In one example such holding is shown to be mechanically effectuated, namely in the case of the cutting of pipes at right angles to their axes of circularity. In other instances, however, the track-unit is held to the work by magnetic means, and in this connection it is particularly to be explained that "magnetic means" is considered to be the equivalent of any conceptually similar adhesive or cohesive means such as might be accomplished by the use of suction cups, chemical adhesives, or other mechanical means particularly where, as in the case of aluminum, stainless-steel or the like, magnetic means would not be operable.

An inventive feature of the invention herein described resides in the provision of elongated forms or sections connectible "either end to either end," in other words by which their end is most convenient, and interchangeably; at the same time rapidly and easily, and equally so with regard to the disconnection of said sections when desired, such track-unit including toothed racking which is longitudinally central with respect to the edges of the track-unit further to facilitate the mating of either end without misalignment.

A further object is to provide in association with forms or sections as in the last preceding paragraph set forth, spaced arms on the length of said sections which are connected pivotally thereto so that they may be swung normal to the longitudinal axis of the sections or rotated to the most convenient angle less than a right angle, such arms having plate-magnets at the ends thereof for effecting cohesion with the work.

A further novel feature resides in the provision of means whereby the disclosed plate-magnets may very easily be pried upwardly from the work to one side of their centres by self-contained lever means for the very convenient and simple accurate positioning of the forms or track-unit sections.

A further novel feature of the disclosed invention resides in the provision of a tool carrying carriage, having roller assemblies upon either side thereof wherein each roller assembly includes a pair of rollers in angular relationship to engage outwardly converging track shoulders or riding surfaces so that differential or torque friction is substantially reduced and which friction causes heavy wear on the riding surfaces particularly of a soft material such as aluminum, due to different peripheral speeds about any given centre of curvature.

A further novel feature resides in the provision of the disclosed means whereby the carriage may most quickly and conveniently be attached and detached from the associated track-unit, and without the necessity for any manual setting or aligning of rollers which, in accordance with the present arrangements automatically align themselves, to the adjacent rail portion.

A further novel feature resides in the simple and mechanically efficient means whereby the carriage may be disconnected from the rack along which it is propelled by its self-contained source of power and the agency of reducing gear means to the end that the carriage may quickly be moved along from one location on the track-unit to another in the event for instance, that it is not wished to tool a certain portion of the work to which it is connected.

A further novel feature of the present invention resides in the simple and convenient track-unit ring, and more particularly the tong means and one point actuating arrangements in connection therewith as a result of which the ring may be securely fastened around any cylindrical form up to a maximum diameter less than that of the ring.

A further novel feature of the present invention resides in means for positioning any ring-like form of track-unit in selective degrees of proximity to the surface of a piece of work to be tooled with the ring occupying a stratum of space between its opposite annular edges which is as nearly as possible parallel with the overall cross-sectional contour of the surface, this in contrast to arranging the ring [circumambientially] *circumferentially* in relation to a cylindrical work form.

A further novel feature resides in the provision of means for easily and quickly compensating for wear in the tool-holding arrangements directly attached to the carriage forming part of the present system so that the tool-holding bar may always be maintained in snug sliding fit as between the sleeve which holds it, and the bar itself.

With the foregoing in view, and such other objects, purposes or advantages as may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIG. 1 is a perspective representation of the present system shown in situ and as employed in the cutting for example of a straight line on a flat metal surface, it being understood that the track-unit section shown may be hilled to any contour as viewed in side elevation according to circumstances.

FIG. 2 is a schematic representation of the carrier of FIG. 1 shown on a ring form of track-unit.

FIG. 3 is a composite fragmentary side elevation and longitudinal cross-section of the upper part of FIG. 2.

FIG. 4 is a view similar to FIG. 3 relative to the lower part of FIG. 2.

FIG. 5 is a view similar to FIGS. 3 and 4 with respect to the right hand portion of FIG. 2 depicting the tong locking means thereof.

FIG. 6 is a section substantially upon the lines 6—6 of FIG. 4.

FIG. 7 is a section substantially on the line 7—7 of FIG. 4.

FIG. 8 is an interior fragmentary plan view on the line 8—8 of FIG. 3.

FIG. 9 is a fragmentary side elevation of the key means for actuating the tongs of FIG. 2 as shown at the right end of FIG. 3.

FIG. 16 is a top plan view of the carriage.

FIG. 17 is a fragmentary composite side elevation and longitudinal cross-section of the front part of the carriage depicting the manner in which the source of power and associated gearing may be freed from the rack.

FIG. 18 is a schematic side elevation depicting the ring track-unit of FIGS. 2 through 9 as employed for cutting a circle in a sheet of work other than as in the severing of a cylinder transverse to its axis of circularity.

FIG. 19 is a composite representation in elevation and cross-section of a means for adjusting the ring track-unit of FIG. 18 as to proximity with the associated work.

FIG. 20 is a section on the line 20—20 of FIG. 19.

FIG. 21 is a representation similar to FIG. 19 but as viewed from the left thereof and minus the ring track-unit.

FIG. 22 is an enlarged representation showing the tool-holding assembly of FIG. 1 with the sleeve thereof in cross-section and minus the left end tool clamping assembly.

FIG. 23 is an underside fragmentary perspective representation of a track-unit form or section depicting the manner of connection thereto of the cross-arms intended to have magnets, suction cups or the like at the ends thereof and also indicated in the accompanying FIG. 1.

FIG. 24 is an underside plan view of the plate-magnets intended to be employed upon the ends of the arms of FIGS. 1 and 23.

FIG. 25 is a cross-section on the line 25—25 of FIG. 24.

FIG. 26 is a detail depicting the key of FIGS. 24 and 25 at right angles to the position therein indicated.

FIG. 27 is a fragmentary underside plan representation of one of the track-unit sections of FIG. 1 or 23 showing the manner of flush-connecting to such sections to either end of one or the other.

FIG. 28 is a fragmentary cross-sectional elevation substantially on the line 28—28 of FIG. 27.

In the accompanying drawings, like characters of reference designate similar parts in the several views.

To summarize initially the two main features of the present inventive concept of a tooling system in terms of (a) the carriage depicted in FIGS. 1, and 10 through 17, and (b) the track-unit as but illustrated in the accompanying FIGS. 1, 10, 15, and 23, carriage A (*FIG. 1*) is driven by the source of power or motor B (*FIG. 11*) cooperation with the rack C (*FIG. 1*) via the drive means extending between said source of power and rack, the same taking the form of the gear reduction assembly connected to B of which the driving gear D (*FIG. 15*) is that which engages rack C. By rotating level E (*FIG. 17*) the gear D is rotated or elevated together with motor B about its pivotal connection at one end of the motor to the carriage, out of mesh with the rack and so may run freely upon the track-unit to which C is affixed by any agency other than said source of power, such as manually.

Figure 11:
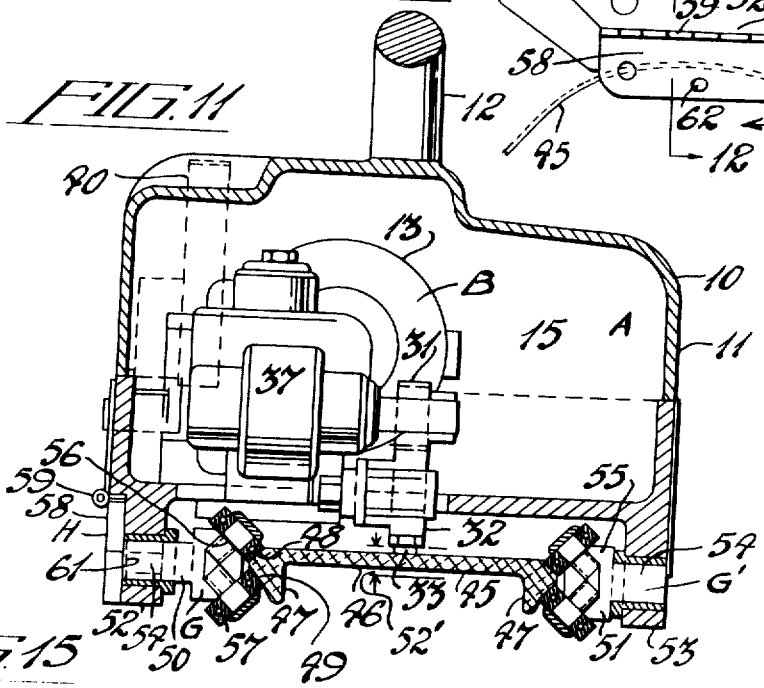
FIG. 11 is an enlarged cross-sectional representation on the line 11—11 of FIG. 10.

The carriage A is removably locked to the rail portions F (*FIG. 1*) by means of the roller assemblies G and G'. The stub-shafts of the former are free to end-shift and be held as depicted in FIG. 11 by the locking of gate H in the stub-shaft abutting position of that figure. When the gate is unlocked to hinge outwardly, the assemblies G may end-shift leftwardly and free carriage A in virtue of an increased distance between the roller assemblies G and G' relative to the rail portions on opposite sides of the intervening body strips of the said track unit, all as will presently become more apparent.

As to the component of FIGS. 2 through 9, the ring H' (*FIG. 1*) which is of a cross-section essentially similar to the track-unit shown in FIG. 1, and having rail portions F on the edges thereof and a circular rack C, is provided with the pairs of tongs J and J' which are caused, in virtue of the rotation of key K (which remains at the location indicated) to close or open simultaneously and equally. This is because key K actuates the rack and pinion L (*FIG. 3*) to which one of the members of each pair of tongs is operatively connected. Locking is effetced by the lever and cam assembly M (*FIG. 5*).

Having thus summarized the main parts of the present invention, the same will now be described in requisite detail, substituting numerals henceforth.

[It should first be pointed out that the invented system herein described has mainly been designed for the purpose of welding in contrast to mere cutting. For the latter purpose only light-weight hose has to be dragged by the carriage and there is less need for proper insulation. Accordingly, it should be added that the swivelling stub-shafts 54 journalled in the rocker flanges, like the shims or discs 156 and the blocks 134 as already stated are preferably formed of insulating material so as to insulate (a) the tool from the carriage, (b) the carriage from the track, and (c) the track from the work. The carriage is designed to support welding equipment of considerable weight in contrast to that which is employed for mere cutting. For example, a coil of welding wire may weigh 60 pounds, and the entire welding equipment supported by the carriage may weigh in the nature of 100 pounds. Accordingly, the entire design of the present system has had regard for the weight to be carried and dragged, as also the liability to short-circuiting as will be apparent from this reference.]

The carriage collectively designated 10 comprises a housing 11 and may be conveniently lifted by the carrying handle 12. Within the housing is a source of power in the form of an electric motor 13 operated from associated mains via lead 14. The motor is rigidly connected within the interior 15 of housing 11 by means of a rigid arm 16 pivoted at 17 to the embossment 18. The motor is further held in line in virtue of the embossment 19 against which the forward end 20 of the bar 16 bears. The motor is further held against counter-clockwise rotation in the plane of the view represented by FIG. 16 in virtue of the clevis process collectively designated 21 (FIGS. 16 and 17) and the cam bearing block 22 which is transversely aligned with a second cam bearing block 23.

Cam 24 extends transversely through the mouth 25 of process 21 and is connected to the external key 26. A downward bias is normally exerted upon the process 21 by spring 27 anchored at the upper end to the said process, and at the lower end 28 to the carriage chassis portion 29.

The gear means 30 comprise upper gear 31, and lower gear 32 which meshes with track 33 when lowered. Gear 32 is shown in FIG. 17 as raised clear of the track, however in virtue of cam 24 being in contact with the upper jaw 34 of the clevis mouth 25. When lever 26 is rotated clockwise or counter-clockwise, obviously gear 32, and motor 13 to which the clevis process 21 is connected will drop into rack engaging contact. It will of course be generally understood that gear reduction means collectively designated 37 are provided operatively associated with the armature of motor 13, which it is not necessary to describe. Gear means [31] *30* is movable through aperture 38 of the carriage chassis generally designated 39.

For purposes of orientation and referring to FIG. 1, a tachometer 40 providing readings in inches per minute is provided. A potentiometer provides speed control via the knob 41. Forward, reverse and arrest of the carriage 10 is effected by the 4-pole switch 42 one pole being for dynamic braking to provide accurate positioning of the welding arc. 43 designates the necessary fuse. A high and low speed range switch 44 is also provided.

[The] *As shown in FIGS. 1 and 8,* track-unit generally designated 45 comprises a central body portion 46, and rail portions collectively designated 47 on either parallel edge of the said body strip. These rail portions in detail each comprise a pair of elongated shoulder strips 48 and 49 having or consisting of outwardly converging riding surfaces and the preferable angle between them is 45°.

Figure 14:
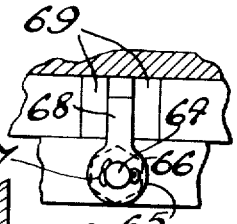
FIG. 14 is a fragmentary detail in elevation showing the gate of FIGS. 10 through 13 locked, and substantially on the line 14—14 of FIG. 12.
Figure 10:
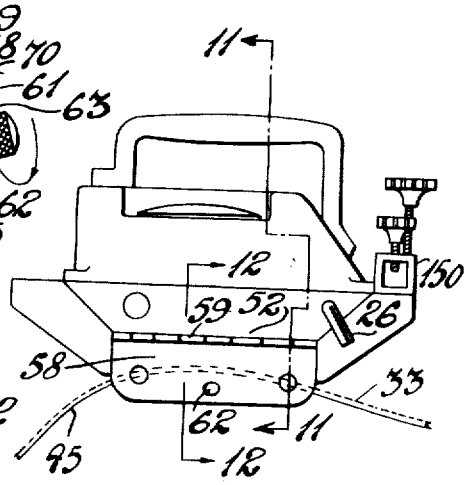
FIG. 10 is a general representation of the carriage forming part of the present invention in side elevation.
Figure 12:
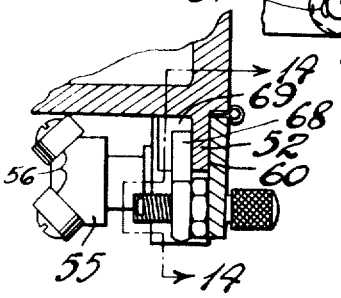
FIG. 12 is a section on the line 12—12 of FIG. 10 with the gate shown locked.
Figure 13:
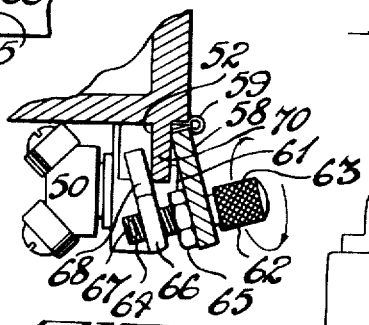
FIG. 13 is a view similar to FIG. 12 with the gate shown open.

To facilitate curving the track-unit such as indicated in the accompanying FIGS. 1, 10 and 23, it will be observed that the rail portions 47 may be if desired slotted at intervals which, generally, would depend as to proximity on the tightness of curvature. The slots 161 may be if desired simple saw cuts or V cuts (inverted with respect to FIG. 23 so that their vertices are coincident with the plane indicated by phantom line 162).

This phantom line is coincident with the undersurface of web or body portion [45] *46*. Hence it will be seen that the cuts extend up to the gutter or grooves 139 (best shown in FIG. 28). From this it will be recognized that the cuts (aided by the gutters to some extent) facilitate curving the track-unit which, it will be recognized, is generally manufactured of aluminum or some other [deformible] *deformable* substance.

The rail portions thus described are engaged by roller assemblies collectively designated 50 and 51, such roller assemblies projecting inwardly from rocker flanges 52 and 53. The said roller assemblies each comprise a stub-shaft 54, a hub 55 on the inner end of the stub-shaft providing angular shoulders 56, and a pair of flat treaded rollers 57 suitably journalled in or on the hubs 55 in the same angular relationship to each other as that between the riding surfaces 48 and 49 *such that each roller of one of roller assemblies, such as 50, rollingly engages one of the converging surfaces of the roller riding surfaces, such as 40, and thereby interlockingly engage the track unit in a manner to be described more fully hereinafter.*

The roller assemblies journalled in the rocker flange 53 may swivel only. However, the stub-shafts of the roller assemblies 50 are longer, and end-shiftably journalled in the rocker flanges 52. They are capable of swivelling as a unit approximately 15° either way from the rail portion engaging position of FIG. 11 and as a result, will always, automatically, align with the rail portions upon attachment of the carriage to a track-unit without the necessity for any manual alignment all as will become clearer as this specification proceeds.

The rocker flange 52 is capable of being covered by a gate 58 hinged at 59. In the locked position the interior surface 60 interfaces the outer surface of the adjacent rocker flange 52, and at the same time abuts, also interfacially, the outer end surface 61 of the stub-shaft 54. It follows that when the gate 58 is unlocked as illustrated in the accompanying FIG. 13 the roller assembly is free to end-shift to the right whereby the distance between opposite pairs 50 and 51 is increased *to completely disengage the rollers of the respective roller assemblies from the roller riding surfaces* so that the carriage may readily be lifted off the track-unit.

The gate 58 is locked by means of the assembly collectively designated 62, the same comprising a knurled finger piece 63 from which extends inwardly, through the gate, a screw-threaded shank 64. The shank is capable of being rotated without endwise movement in virtue of the locknut 65. Upon the shank 64 is threadably secured a key bolt 66. The key bolt cannot be screwed off the shank 64 in view of the split pin 67 which extends through the end of shank 64. The shank 68 of key bolt 66 is retained between the pair of spaced and projecting retainer wall portions 69 hence cannot rotate. Hence, since shank 64 cannot end-shift but only rotate, key bolt 66 can only end-shift upon the shank between the limits of the locknut 65 and the split pin 67. Rotation of the finger piece 63 clockwise therefore rotates the gate 58 to the open position of the accompanying FIG. 13 until the shank 68 binds against the particular portion 70 of the rocker flange 52 between the portions 69. This is just sufficient to permit outward or end-shifting movement of the roller assemblies 50 sufficient to free the carriage from the track-unit.

Figure 15:
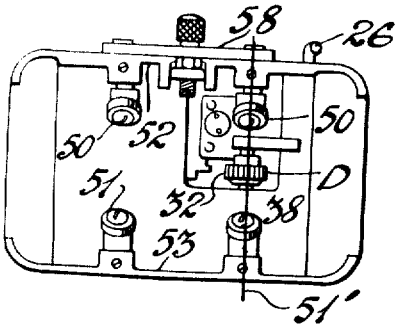
FIG. 15 is a general underside plan view of the carriage of FIG. 10.

In connection with the carriage 10, and as best shown in FIGS. 10, 11, and 15, but also in FIG. 2, it is important to notice a salient novel feature of the present invention emphasized by the [transverse vertical axial plane of a roller-assembly on opposite sides of the carriage 10 and the gear 32] *arrangement of one set of roller assemblies, such as 50 and 51, and the gear 32. In such arrangement, the swivel axis of each of the associated stub shafts 54 thereof are axially aligned with one another and together with the rotational axis of the gear 32, as shown in FIGS. 11 and 15, define a common plane such as at 51; which extends normal to the track unit.* It is only because of this unique arrangement that the carriage is able to crawl without obstruction over convexities such as depicted in side view in the portion of track-unit 45 of FIG. 10. The carriage is in fact able to travel, under its own power externally or internally with respect to quite tight or short radii, in other words, over track which is in the form of hill or valley without the gear 32 either binding against the track 33 (in the case of travelling over a convex surface), or leaving the track, in the case of travelling over a concave surface.

When the drive-gear 32 is in the transverse vertical coplanar alignment just stated, with the opposite roller-assemblies, it is obvious that under all conditions, the space such as indicated by 52' in FIG. 11 must always be constant. If that condition is satisfied concavities and convexities may be negotiated to an extent limited only by the clearance between the rack and the carriage chassis clearly of course, in addition, the roller-assemblies must swivel to the extent desired. Thus, since it has been mentioned that the roller-assemblies are (without limitation of course) designed (by means obvious to those skilled in the trade to which this invention pertains) to swivel 15° on either side of the position represented by FIG. 11, then the carriage can negotiate a convexity or a concavity of the track-unit representing an arc of 30° of which the chord is equal to the distance between the axes of a pair of roller-assemblies on the same side of the carriage.

Proceeding next to describe in detail the ring form of track-unit in the accompanying FIGS. 2 through 9 in detail, it will be seen that, essentially, the cross-sectional contour of the form of track-unit employed to form the ring collectively designated 71 is essentially similar to the conformation 45, 46, 47 as best illustrated in FIGS. 1 and 11 and has accordingly in this context also been so designated. Within the shallow channel 72 existing between the rail portions 47 is a 180° lining or band collectively designated 73 extending between the tong bearings collectively designated 74 and 75. The greater exposed or inner portion of the surface 76 is smooth. However, a portion of it, generally (but strictly without limitation) between 50 and 60°, is racked as at 77.

The tong bearing block 74 is secured to the end of the band [76] *73*, and from FIG. 3 it will be observed that the racked portion 77 commences at its junction with the said block. The band 73 is held on centre to facilitate its rotary motion within the trough 72 as by means of the pairs of rollers 78. Any desired means such as ball-bearings between the inner surface of the body strip 46 and the interfacing surface of the band 73 for reducing friction may if desired be resorted to. In addition, since the band 73 is only half the [diameter] *circumference* of the ring 71, certain rollers 79 should be provided which overlap the band as depicted in FIG. 8. In this way the band is secured against parting inwardly from its interfacial parallelism with the inner surface of body portion 46.

The tong blocks 74 and 75 may generally be similar, and as exemplified comprise an inwardly projecting bearing portion 80 secured to the band 73 [centrally] *and centrally disposed with respect thereto,* being transversely apertured to receive the pivot pins 81 by which the movable tong arms 82 and 83 are secured.

The movable tong arms 82 and 83, and also the stationary tong arms 84 and 85 are essentially similar in comprising the pair of spaced parallel bars 86, the outer end distance pieces 87, and the inner serrated gripping elements 88. Bearing forks 89 straddling the blocks 74 and 75, and the fixed block 90 are pivotally secured to these by such as pivot pins 81. It should be noted however that the block 90 is secured directly to the body portion 46 of the track-unit 45 and hence, the arm or arms 85, like the arm or arms 84 are fixed for pivotal movement only at the stations indicated, and not free to rotate within the trough 72 as are the arms 82 and 83.

The pairs of bars 83 of the arms 82 and 84 intersect pivotally at 91. The arms 83 and 85 similarly intersect at the pivot point 82. The actuating location of the band 73 is at the root of tong bar 84 at which place it will be seen that a pair of spaced bearing blocks 93 are fixed to body portion 46, optionally to overlie slightly the band 73, and receive the shank 94 of the key 95. Between the blocks 93, and fixed to the said shank is a gear 96. On the end of shank 94 is a winding handle 97. From the foregoing it follows that when gear 96 is rotated clockwise with respect to FIG. 2, band 73, and blocks 74 and 75 will also move clockwise thus drawing together all four of the serrated grippers 88 to effect a four-point grab on a cylindrical pipe therebetween.

The grippers may be securely locked by rotating the right angular handle 98 to which is secured transverse cam 99 located between a pair of blocks 100 essentially similar to blocks 93. This obviously effects a binding action on band 73 so that the described pairs of tongs cannot slack off.

The track-unit 45 as well as being curved as in FIG. 10 may be in the form of a ring 71 or any shape of closed curve, and may be secured to a flat or curved sheet 101 of metal or other substance by first means in the form of simple posts or brackets such as 102 in the accompanying FIG. 18, to which brackets are attached second means comprising at least three magnetic attaching assemblies 103. The said first and second means are for maintaining the ring spaced from the work and for maintaining it so spaced. In the accompanying FIGS. 19 through 21 however there is shown a means whereby the ring 71 may be selectively positioned in a stratum of space between its opposite annular edges (or rail portions 47) so that the distance between the ring and the work may be varied to fit the circumstances.

The arrangements of the just noted figures therefore comprise a racked standard 104 and a post 105 in longitudinally sliding parallel relationship with said standard. The lower end of the post 105 is provided with a square collar 106 through one of which extends a shank 107 to which is keyed a gear 108, the shank being provided with a knurled handle 109' for rotating the same.

Gear 108 is in mesh with a rack 109 on standard 104. Lock screw 110 is for the purpose of maintaining parts 104 and 105 in any desired extent of overlap. The upper end of post 105 is secured by any suitable block means 111, or otherwise, to ring 71. Any suitable means requiring mere skill in the art for maintaining the upper end of standard 104 in parallel interfacial relationship with post 105 may be provided.

At the lower end of standard 104 is an offset bearing or the like, 112, secured in the clevis 113. The clevis in turn is secured pivotally via the bolt 114 to cross-arm 115, to the outer ends of which are plate-magnets 116.

These magnets may also be secured to the outer ends of slightly domed portions 117 of the arms 115. If so the roof 118 of the casing 119 may also be complementarily domed. The magnets 116 are otherwise discoid, the casing being hollow and filled with bonding material 120 to secure in place ceramic magnets between the metallic work contacting pole plates 121 and 122.

The latter is provided with a drilling 123, preferably shouldered as at 124 to receive the plunger or end-shiftable pry plug 125. Extending at right angles through the magnet, to register with drilling 123 is an aperture 126 through which extends the right angulated lever 127. The inner end of this lever (which is of round wire stock or the like for preference) is ground off to form a semi-circular cam 128 (FIG. 26). Accordingly, when the handle portion 129 is rotated 90°, the plunger 125 (which is normally up due to the magnetic field of force) is forced downwardly into the position of FIG. 25 to exercise a pry upwardly upon the magnet to one side thereof whereby the same may very easily be adjusted over a sheet of metal such as 130° of FIG. 1, or bodily removed. A small pin 130 projecting from the horizontal portion 131 of the lever 127 and externally of the magnet may be provided to co-operate with outwardly projecting pins 132 and 133 to limit the rotation of part 129 to slightly more than 90°, it being understood that part 132 will be beneath the portion 131, while the pin 133 will be to one side and a little above the axis of the portion 131.

In the accompanying FIG. 23 there has been illustrated the manner in which arms 115 are secured rotatably to the underside of track-units 45 so as to be capable of rotation in the plane thereof. Such arrangements comprise a block 134 of insulating material generally of the configuration illustrated and extending the width of the body portion 46. These blocks are secured as illustrated preferably by two bolts extending through the wing portions 135. A single screw (not shown) secures the bars via the central aperture 136 to the block 134.

In the accompanying FIGS. 27 and 28 there has been illustrated the manner in which two track-unit forms or sections (of the configuration of FIG. 1 or 23) may be secured together in flush-fitting alignment. At opposite ends of each section, and in opposite corners, a connecting plate 137 is secured, the same being in lapping relationship with the interior surface 138 of the body portion 46 and projecting beyond the end of each section. The aforesaid connecting plates are also receptive within the grooves 139 formed at the junctions of the body portion and the rail portions 47. They are secured as by the pair of rivets 140, and upon the projecting end 141 thereof are provided with the open ended, bevel-edged apertures 141 wherein the diameter of the trough 142 is somewhat greater than that of the parallel flanking portions 143.

Adjacent the opposite edge of the body portion 48 to that upon which the connecting plate 137 is secured is a squared aperture 144 (shown tapered in FIG. 28 but preferably not) within which is held captive a locking means 145 comprising a screw threaded shank also preferably squared for non-rotation but for end-shifting movement, said shank having a frusto-conical head 146, and a knurled screw 147 on the other side of the body portion held against loss by such as a split pin 148. Head 146 is recessed to receive any type of a screw driver. Thus the connecting plates 137 may readily be introduced via the apertures 141 to means 145 which lie semi-flush while passing through flanking portions 143, but flush fully with the flat heads 146 and the surrounding plate surface, when the shanks have entered the larger trough portion 142.

In the accompanying FIG. 22 there has been illustrated a novel means by which the tool-holding arm 149 may be slideably held within sleeve 150, and means provided in this connection for compensating for wear so that a snug fit may be maintained for a very long period as between the arm 149 and the said sleeve.

It will be appreciated that the arm 149 will be subjected to considerably longitudinal wear due to the need for very frequent adjustments with respect to sleeve 150, and will also be of relatively soft metal. The details of this arrnagement will therefore now be described.

Sleeve 150 is formed of two right angular parts 151 and 152, the same being abuttably mated as clearly depicted in the accompanying FIG. 22. Long screw-threaded bolts 153 connect the parts 150 and 152 together, one of the bolts of course being out of sight behind the rotatable stem 154.

The cross-section of the arm 149 is designed to accommodate a rack 155 on all four sides as wear takes place. It will also be observed that a space exists between the sleeve 150 and the rod 149 which is occupied by the four pairs of longitudinally extending shims 156. Instead of longitudinally extending shims, these may if desired be in the form of small insulating discs, nylon or whatever suitable material may be desired. Under any conditions, however, wear will take place, and when it does, it is a simple matter to separate parts 151 and 152, and then grind down slightly the edges 157 so as to restore a snug fit as depicted.

It will be recognized that stem 154 has secured thereon a gear 158 in mesh with rack 155, a knurled knob 159 being provided upon the end of stem 154. Knurled knob and screw-threaded stem collectively designated 160 is simply a means for locking the bar 149 at any transverse longitudinal location desired. It will be understood that the shims 156, of whatever form will be secured against the inner surfaces of the sleeve 150.

*It should be pointed out that the invented system herein described has mainly been designed for the purpose of welding in contrast to mere cutting. For the latter purpose only light-weight hose has to be dragged by the carriage and there is less need for proper insulation. Accordingly it should be added that the swivelling stub-shafts 54 journalled in the rocker flanges, like the shims or discs 156 and the blocks 134 as already stated are preferably formed of insulating material so as to insulate (a) the tool from the carriage, (b) the carriage from the track, and (c) the track from the work. The carriage is designed to support welding equipment of considerable weight in contrast to that which is employed for mere cutting. For example, a coil of welding wire may weigh 60 pounds, and the entire welding equipment supported by the carriage may weigh in the nature of 100 pounds. Accordingly, the entire design of the present system has had regard for the weight to be carried and dragged, as also the liability to short-circuiting as will be apparent from this reference.*

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed as new is:

1. A welding, cutting or the like tool holding carriage for use in combination with a track unit, which track unit comprises essentially an elongated body portion *including parallel opposite edges,* carriage roller riding surfaces in the vicinity of said opposite parallel edges [of said body portion]; said carriage being characterized by [(i)] having *swivelly* attached upon *its* opposite sides [of said carriage] a plurality of [swivelling] spaced roller assemblies *disposed for interlocking engagement with said track unit adjacent said opposite edge and in rolling engagement on said roller riding surfaces,* [which are transversely variably spaceable] said roller assemblies are movable *relative to one another in a direction transversely of the lengthwise direction of said track unit for moving said roller assemblies into and out of interlocking engagement with said track unit,* [and] selectively [and rollably] releasable locking means [(ii)] *on said carriage coactingly engaging certain of said roller assemblies to prevent movement of said roller assemblies relative to one another* for *locking* [securing] said carriage to said track *unit* via said roller assemblies, *and said locking means is movable relative to said carriage to release the roller assemblies on one side for movement relative to the roller assemblies on the opposite side of said carriage for* [or] unlocking [the same therefrom] *said roller assemblies from said track unit* by varying the space between said roller assemblies on opposite sides of said carriage *to enable said carriage to be completely removed from said track unit.*

2. The invention according to claim 1 which is further characterized by including [(i)] a source of power for moving said carriage along said track unit which is pivotally connected for limited rotation about one end thereof to said carriage, [(ii)] drive means operatively connected to said source of power and frictionally engageable with said track unit [(iii)] a cam assembly at the opposite end of said source of power to that at which the same is so pivotally connected, [(iv)] a cam element included in said cam assembly co-acting between said source of power at said opposite end thereof and said carriage so as, upon actuation, to rotate such source of power about said pivotal connection, and thereby operably disconnect said drive means from said track unit.

3. The [carriage] *invention* according to claim 1 in which said rollers of each assembly have a flat tread, the tread of one roller being angularly related to the tread of the other roller.

4. The [carriage] *invention* according to claim 3 in which said roller-assemblies are inwardly directed toward each other.

5. The [carriage] *invention* according to claim 1 which is further characterized by including rocker flanges extending along the base thereof in adjacent lapping relationship with said riding surfaces, said roller-assemblies including stub shafts journalled in said flanges, the stub-shaft of each roller-assembly on one of said flanges being end-shiftable within limits, a gate in lapping relationship with the rocker flange on which said end-shiftable shaft is journalled, said gate being movable between a locked position in which it abuts said stub-shaft so as to prevent end-shifting thereof to retain said rollers in engageable relation with the adjacent riding surface, and an unlocked position in which said shaft is free to end-shift, whereby the distance between the roller assemblies on opposite sides of said carriage is altered for detachment of said carriage from said track-unit.

6. The [carriage] *invention* according to claim 5 which is further characterized in that said gate is [(i)] in outer overlapping relationship with said rocker-flange, and [(ii)] hinged for rotation between and locking and unlocking positions, respectively to prevent and permit outward end shifting of said stub-shaft against which it abuts, whereby said distance between said opposite side roller-assemblies is increased in unlocked position relative to the spacing apart of said riding surfaces.

7. The [carriage] *invention* according to claim 1 which is further characterized by including rocker flanges extending along the base thereof in adjacent lapping relationship with said riding surfaces, said roller-assemblies being journalled in said flanges, the stub-shaft of each roller-assembly on one of said flanges being end-shiftable within limits, a gate in lapping relationship with the rocker flange on which said end-shiftable shaft is journalled, said gate being movable between a locking position in which it abuts said stub-shaft to prevent end-shifting thereof, to retain said rollers in engagement with the adjacent riding surface, and an unlocked position in which said shaft is free to end-shift, whereby the distance between the roller-assemblies on opposite sides of said carriage is altered for detachment of said carriage from said track-unit.

8. The [carriage] *invention* according to claim 7 which is further characterized in that said gate is [(i)] in outer overlapping relationship with said rocker flange, and [(ii)] hinged for rotation between said locking and unlocking positions, respectively to prevent and permit outward end-shifting of said stub-shaft against which it abuts whereby said distance between said opposite side roller-assemblies is increased in unlocked position relative to the spacing apart of said riding surfaces.

9. The [carriage] *invention* according to claim 1 wherein said roller-riding surfaces constitute rail-portions which project from one of the surfaces of said body portion so as to provide a shallow elongated recess upon that side of said unit from which said rail-portions project, said riding surfaces converging at an angle of approximately 45° and which also includes, in combination with said track-unit, stabilizing and attaching arms connected at intervals to the posterior side of said track-unit, said arms being capable of extension transversely to the longitudinal axis of said track-unit outwardly beyond said rail-portions, and means in operable connection with said arms in the form of holders, for adhesively attaching said track-unit to a piece of work.

10. The [carriage] *invention* according to claim 1 which is further characterized by including rocker flanges extending along the base thereof in adjacent lapping relationship with said riding surfaces, said roller-assemblies being journalled in said flanges, said roller-assemblies including stub-shafts, the stub-shaft of each roller-assembly on one of said flanges being end-shiftable within limits, a gate in lapping relationship with the rocker-flange on which said end-shiftable shaft is journalled, said gate being movable between a locking position in which it abuts said stub-shaft to prevent end-shifting thereof, to retain said rollers in engagement with the adjacent riding surface, and an unlocked position in which said shaft is free to end-shift whereby the distance between the roller-assemblies on opposite sides of said carriage is altered for detachment of said carriage from said track-unit.

11. The [carriage] *invention* according to claim 10 which is further characterized in that said gate is [(i)] in outer over-lapping relationship with said rocker-flange, and [(ii)] hinged for rotation between said locking and unlocking positions, respectively to prevent and permit outward end-shifting of said stub-shaft against which it abuts, whereby said distance between said opposite side roller-assemblies is increased in unlocked position relative to the spacing apart of said riding-surfaces.

*12. The invention according to claim 1, including a source of power for moving said carriage along said track unit, drive means including a rotatable drive element operatively connected to said source of power and engageable with said track unit for moving said carriage along said track unit, and the swivel axis of said swivel connections of said roller assemblies and the rotational axis of the rotatable drive element are disposed in a common plane.*

*13. The invention according to claim 12, wherein said common plane extends normal to said track unit to enable said carriage to travel over hills and valleys in said track unit without binding of said carriage with said track unit.*

*14. The invention according to claim 1, wherein each of said roller assemblies includes a pair of rollers, each of said rollers of said pair includes a flat tread with the tread of one roller angularly disposed with respect to the tread of the other roller for receiving a roller riding surface therebetween, and said roller riding surfaces each includes converging surfaces which converge toward one another at the same angle as the angular disposition of said treads such that one of said rollers rides on one converging surface, while the other of said rollers rides on another of said converging surfaces for interlocking said roller assemblies on said track unit in locked condition of said locking means.*

*15. The invention according to claim 14, wherein each of said roller assemblies includes a stub shaft journalled for rotation in said carriage, and said stub shaft of said roller assemblies on one side of said carriage are movable in an axial direction and relative to said carriage for moving said treads out of engagement with said converging surfaces to enable removal of said carriage from said track unit.*

*16. The invention according to claim 1, wherein said carriage includes a pair of roller assemblies on each of the opposite sides of said carriage, each of said roller assemblies includes a pair of rollers for engagement with said track unit, and one pair of said roller assemblies on one side of said carriage is disposed for rolling engagement along the roller riding surface on one side of said track unit and the other pair of roller assemblies on the opposite side of said carriage is disposed for rolling engagement with the roller riding surface on the other side of said track unit, said one pair of roller assemblies on one side of said track unit are movable relative to said carriage and away from said track unit upon release of said locking means to enable removal of said carriage from said unit, and each of said roller assemblies include a pair of rollers which are movable on a unit upon movement of the roller assembly with which they are associated.*

*17. A welding, cutting or the like tool holding carriage for use in combination with a track unit, said track unit comprising essentially an elongated body portion including parallel opposite edges extending in the lengthwise directions of said body portion, said body portion including roller riding surfaces extending along said opposite edges in the lengthwise direction thereof, said carriage includes one pair of roller assemblies on one side for engaging the roller riding surface along one edge of said body portion and another pair of roller assemblies on the opposite side of said carriage for engaging the roller riding surface on the opposite edge of said body portion in the mounted position of said carriage on said track unit, each of said roller assemblies including a pair of rollers for rolling engagement along said roller riding surfaces, said roller riding surfaces each including converging surfaces which converge toward one another in a direction transverse to the lengthwise direction of said body portion, one roller of each pair of roller assemblies being angularly disposed with respect to the other roller of each pair of roller assemblies and disposed at an angle approximately the same as the angle of convergence of said converging surfaces such that said one roller of each pair rides on a different converging surface than said other roller in the mounted position of said carriage on said track unit for locking said carriage on said track unit, said roller assemblies are swivelly mounted on said carriage each having its swivel axis extending in a direction transverse to the lengthwise direction of said body portion to enable*

*said carriage to ride along curves in said track unit, each roller assembly of one pair of roller assemblies on one side of said carriage is movably mounted in said carriage for movement in the direction of its swivel axis to enable said roller assembly to move in a direction away from the roller assemblies on the opposite side of said carriage and in a direction transverse to the lengthwise direction of said body portion to enable disengagement of its associated rollers from said roller riding surfaces and out of interlocking engagement with said track unit, and selectively releasable locking means movably mounted on said carriage for movement between a locking position in abutting engagement with said one pair of roller assemblies to prevent movement of said one pair of roller assemblies in a direction transverse to said body portion and an unlocked position for releasing said one pair of roller assemblies for movement away from said other pair of roller assemblies to enable said carriage to be completely removed from said track unit.*

References Cited

The following references, cited by the Examiner, are of record in the patented file of this patent or the original patent.

UNITED STATES PATENTS

| | | | |
|---|---|---|---|
| 1,358,637 | 11/1920 | Herron. | |
| 2,146,959 | 2/1939 | Kugel. | |
| 2,474,153 | 6/1949 | Livesay. | |
| 2,571,196 | 10/1951 | Bucknam et al. | |
| 3,079,191 | 2/1963 | Engelsted et al. | |
| 2,631,028 | 3/1953 | Murr | 266—23 C |
| 3,229,883 | 1/1966 | Yost | 228—25 |

ERNEST R. PURSER, Primary Examiner

U.S. Cl. X.R.

33—21; 173—24; 238—1; 266—23